(12) United States Patent
Maeda

(10) Patent No.: US 6,247,323 B1
(45) Date of Patent: Jun. 19, 2001

(54) AIR-CONDITIONING SYSTEM

(75) Inventor: Kensaku Maeda, Fujisawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/402,644

(22) PCT Filed: Apr. 10, 1998

(86) PCT No.: PCT/JP98/01660

§ 371 Date: Oct. 8, 1999

§ 102(e) Date: Oct. 8, 1999

(87) PCT Pub. No.: WO98/46958

PCT Pub. Date: Oct. 22, 1998

(30) Foreign Application Priority Data

Apr. 11, 1997 (JP) .................................................. 9-110143

(51) Int. Cl.[7] .................................................. F25D 23/00
(52) U.S. Cl. .................................................. 62/271; 62/94
(58) Field of Search .................. 62/271, 94, 92, 62/333

(56) References Cited

U.S. PATENT DOCUMENTS

| | | | |
|---|---|---|---|
| 4,864,830 * | 9/1989 | Ryham | 62/94 |
| 4,887,438 | 12/1989 | Meckler | 62/271 |
| 5,325,676 | 7/1994 | Meckler | 62/93 |
| 5,364,455 | 11/1994 | Komarneni et al. | 95/117 |
| 5,448,895 | 9/1995 | Coellner et al. | 62/94 |
| 5,551,245 * | 9/1996 | Calton et al. | 62/90 |
| 5,718,122 | 2/1998 | Maeda | 62/185 |
| 5,758,509 | 6/1998 | Maeda | 62/94 |
| 5,761,923 | 6/1998 | Maeda | 62/271 |
| 5,761,925 | 6/1998 | Maeda | 62/476 |
| 5,791,157 | 8/1998 | Maeda | 62/483 |
| 5,816,065 | 10/1998 | Maeda | 62/271 |
| 5,931,015 | 8/1999 | Maeda | 62/271 |
| 5,943,874 | 8/1999 | Maeda | 62/271 |
| 5,950,442 | 9/1999 | Maeda et al. | 62/175 |
| 5,950,447 | 9/1999 | Maeda et al. | 62/271 |
| 6,029,467 * | 2/2000 | Moratalla | 62/271 |

* cited by examiner

Primary Examiner—Michael Buiz
Assistant Examiner—Melvin Jones
(74) Attorney, Agent, or Firm—Armstrong, Westerman, Hattori, McLeland & Naughton, LLP

(57) ABSTRACT

This invention provides an air conditioning system with a superior dehumidifying and sensible heat processing capability as well as energy saving, by enhancing the heating ability for the regeneration air, as well as enabling to increase the cooling performance (sensible heat processing performance) for the process air, and comprises a desiccant 103 for adsorbing moisture from process air; and a heat pump 200, including a compressor 260, that operates by using process air as a low-temperature heat source 240 and regeneration air as a high-temperature heat source 220 so as to supply heat to regeneration air for regenerating the desiccant; wherein a high-temperature heat source heat exchanger for exchanging heat with pre-desiccant regeneration air and refrigerant comprises a plurality of sections 220A, 220B, 220C, 220D divided along an air flow direction, and regeneration air passes the sections in an opposite order to that of refrigerant so that refrigerant, once condensed in the heat pump, is further cooled.

5 Claims, 9 Drawing Sheets

AIR-CONDITIONING SYSTEM

TECHNICAL FIELD

This invention relates to air conditioning systems, and relates, in particular, to an air conditioning system that can operate continually an air dehumidifying process by a desiccant and regeneration of the desiccant by heat pump.

BACKGROUND ART

FIG. 5 shows a system based on the conventional technology disclosed in a U.S. Pat. No. 4,430,864, which is comprised by: process air passage A; regeneration air passage B; two desiccant beds 103A, 103B; a heat pump for regeneration of desiccant and cooling of process air. The heat pump uses heat exchangers 220, 210 embedded in the two desiccant beds 103A, 103B as high and low temperature heat sources respectively, in which one desiccant bed performs dehumidifying by passing process air, and the other desiccant bed performs regeneration of desiccant beds by passing regeneration air. After air conditioning is carried out for a specific time interval, four-way switching valves 105, 106 are operated to perform reverse processes in respective desiccant beds by flowing regeneration air and process air in the opposite desiccant beds.

In the conventional technology described above, high and low heat sources of the heat pump and each desiccant are integrated in each unit, and, an amount of heat equivalent to the cooling effect ΔQ, is totally loaded on the heat pump (vapor compression refrigeration cycle). That is, cooling effect cannot exceed the capability of the heat pump (vapor compression refrigeration cycle) used. Therefore, there is no benefit resulting from making the system complex.

Therefore, to resolve such problems, it is possible to consider a system, such as the one shown in FIG. 6, to heat the regeneration air by placing a high temperature source 220 in the regeneration air passage B, and placing a low temperature air source 240 in the process air passage A to cool the process air, as well as to provide a heat exchanger 104 for exchanging sensible heat between the post-desiccant process air and pre-desiccant regeneration air. In this case, the desiccant 103 uses a desiccant wheel which rotates so as to straddle the process air passage A and the regeneration air passage B.

This system can provide cooling effect (ΔQ), which is a sum of the cooling effect produced by the heat pump and the cooling effect produced by sensible heat exchange performed between process air and regeneration air, as shown in the psychrometric chart presented in FIG. 7, thus producing a system of a more compact design and capable of generating a higher cooling effect than that produced by the system shown in FIG. 5.

In such a heat pump 200, it is necessary to provide a high-temperature heat source with a temperature of over 65° C. for desiccant regeneration, and a low-temperature heat source with a temperature of about 10° C. for cooling process air. A vapor compression type cooling process for a refrigerant HFC134a is shown in a Mollier diagram shown in FIG. 8, and the temperature rise is 55° C., and the pressure ratio and compressor power are closer to the heat pump in a conventional air conditioning system based on refrigerant HCFC22. Therefore, there is a possibility of constructing a heat pump using a compressor for HCFC22 for desiccant regeneration in air conditioning systems.

However, in a system of such a configuration, if a conventional type of so-called plate-fin-coil heat exchanger of a single assembly unit, as shown in FIG. 6, is used as a high-temperature heat source heat exchanger, in which refrigerant flows through multiply branched refrigerant passages in a cross flow relation to the air, and the refrigerant and the air exchange heat in a state of disorderly temperature distribution, heat energy retained by the refrigerant cannot be transferred adequately to the air.

A relation between the temperature changes and enthalpy changes for the refrigerant and the regeneration air at the known heat exchanger is illustrated in FIG. 9. As shown in FIG. 9, when refrigerant of the heat pump and regeneration air exchange heat, enthalpy changes for the refrigerant and regeneration air are equal due to heat balance. In the heat exchange process, refrigerant loses its enthalpy in a sensible heat change process from a superheated vapor state at the exit of the compressor until it starts condensation, and loses its enthalpy in a condensation process through a latent heat change process while maintaining its temperature constant, and further loses its enthalpy in a sensible heat change process from a saturated liquid state to a supercooled liquid state. On the other hand, regeneration air gains enthalpy in a sensible heat change process in the heat exchanger process.

When these mediums exchange heat to each other in the above described steps, the process can be approximated by a condensation heat transfer process at a constant temperature of 65° C. for the refrigerant, and by a sensible heat change process with an inlet temperature of 40° C. for the regeneration air, and this process can theoretically provide NTU (number of heat transfer unit) of about 1.7 and temperature effectiveness of 80% according to a characteristics of a crossflow type heat exchanger in which the refrigerant is mixed. Thus, outlet temperature of regeneration air is given by:

$$40+(65-40)\times 0.8 = 60° C.$$

so that regeneration air is heated to 60° C.

Therefore, as shown in FIG. 9, regeneration air stays in the heat exchanger 220 in a temperature range from 40° C. to 60° C., and the refrigerant exchanges heat with such regeneration air in a state of disorderly temperature distribution. Therefore, refrigerant liquid having its lowest enthalpy at the exit of the condenser cannot always contact with the regeneration air at the inlet at its lowest temperature of 40° C., and supposedly contacts with the regeneration air at the average regeneration air temperature of 50° C. Assuming that refrigerant is supercooled by the heat transferred from the area corresponding to 10% of the entire heat transfer area, which may be overestimated, NTU at this area is given by:

$$NTU = 1.7 \times 0.1 = 0.17,$$

and since the temperature effectiveness is approximated by the formula:

$$\Phi = 1 - 1/exp(NTU),$$

the temperature effectiveness is theoretically calculated as:

$$\Phi = 1 - 1/exp(0.17) = 0.156.$$

Thus, the temperature of the supercooled refrigerant liquid is:

$$65 - (65-50) \times 0.156 = 62.7° C.$$

By actually calculating the ratio of enthalpy change for the supercooling effect by using the enthalpy value at 62.7° C., a value of 2.5% is obtained as shown in FIG. 9. Therefore, heat transfer area was overestimated in the assumption for the above calculation, and the actual NTU is lower and the degree of supercooling is further lower so that the refrigerant liquid temperature will become a little higher than the above calculated value.

Thus, even when retaining the regeneration air of 40° C. as the lowest temperature for a cooling heat source, refrigerant liquid can be cooled only to 62.7° C. at the most, that is, the heat energy retained in the refrigerant cannot be transferred effectively to the air. Also, since the refrigerant at the inlet of the low-temperature heat source heat exchanger still has a high enthalpy, refrigerating effect in the low-temperature heat source heat exchanger becomes small. Accordingly, heating quantity of the cooling regeneration air and the cooling effect are smaller than the case where refrigerant liquid is cooled to 40° C., so that it is necessary to circulate a larger quantity of refrigerant for heating regeneration air so as to degrade the coefficient of performance. (As shown in FIG. 8, if heating quantity of the heat pump is taken as 100%, compressor power corresponding to heat quantity of 28% is necessary, and the refrigeration effect remains 72%.)

This invention has been made to solve the problems outlined above by providing an air conditioning system that can produce continual dehumidification of supply air and desiccant regeneration, by developing a system in which the refrigerant once condensed in the heat pump is further cooled by exchanging heat with the regeneration air at its lowest temperature staying at the inlet of the high-temperature heat source heat exchanger, so that heat energy of the refrigerant is adequately transferred to the regeneration air thereby to raise the heating ability of the heat pump for the regeneration air, as well as to enable enhancing the cooling ability for process air, thus providing an energy saving air conditioning system with a superior dehumidifying and sensible heat processing capability.

DISCLOSURE OF INVENTION

This invention is provided to achieve the above objectives, and the invention according to a first aspect is an air conditioning system comprising: a desiccant for adsorbing moisture from process air; and a heat pump, including a compressor, that operates by using process air as a low-temperature heat source and regeneration air as a high-temperature heat source so as to supply heat to regeneration air for regenerating the desiccant; wherein a high-temperature heat source heat exchanger, for exchanging heat with pre-desiccant regeneration air and refrigerant, comprises a plurality of sections divided along an air flow direction, and regeneration air passes the sections in an opposite order to that of refrigerant, so that refrigerant once condensed in the heat pump, is further cooled.

Accordingly, by dividing the high-temperature heat source heat exchanger into a plurality of sections so as to avoid a disorderly state in the temperature distribution and to make the refrigerant exchange heat with the regeneration air in a counter flow manner, and by making the refrigerant, once condensed in the heat pump, to be further cooled by exchanging heat with the regeneration air at its lowest temperature staying at the inlet of the high-temperature heat source heat exchanger, so that heat energy of the refrigerant is adequately transferred to the regeneration air, the heating ability of the heat pump for the regeneration air can be raised, and the cooling ability for process air is also increased.

The invention according to a second aspect is an air conditioning system comprising: a desiccant for adsorbing moisture from process air; and a heat pump, including a compressor, that operates by using process air as a low-temperature heat source and regeneration air as a high-temperature heat source so as to supply heat to regeneration air for regenerating the desiccant; wherein paths of process air and regeneration air that pass through the desiccant are divided into a first zone for performing dehumidifying of process air and a second zone for performing regeneration of the desiccant using regeneration air so that the desiccant repeatedly shifts its position between the first path and the second path; and wherein a high-temperature heat source heat exchanger, for exchanging heat with pre-desiccant regeneration air and refrigerant, comprises a plurality of sections divided along an air flow direction, and regeneration air passes the sections in an opposite order to that of refrigerant so that refrigerant, once condensed in the heat pump, is further cooled.

Accordingly, by dividing the high-temperature heat source heat exchanger into a plurality of sections so as to avoid a disorderly state in the temperature distribution and to make the refrigerant exchange heat with the regeneration air in a counter flow manner, and by making the refrigerant, once condensed in the heat pump, to be further cooled by exchanging heat with the regeneration air at its lowest temperature staying at the inlet of the high-temperature heat source heat exchanger, so that heat energy of the refrigerant is adequately transferred to the regeneration air, and then by leading the regeneration air to the regeneration zone for the desiccant, dehumidification ability of the desiccant is increased and the cooling ability for process air is also increased.

The invention according to a third aspect is an air conditioning system further comprising a constriction device arranged in a refrigerant path at least connecting a first section most adjacent to an inlet for regeneration air and a second section second adjacent to the inlet for regeneration air so that a refrigerant pressure in the first section is maintained lower than that in the second section.

Accordingly, in the process of further cooling the refrigerant, once condensed in the heat pump, by providing a stepwise process of reducing condensed refrigerant pressure to undergo self-evaporation, and making it exchange heat with the regeneration air to be re-condensed, the refrigerant can undergo a state change through a condensation heat transfer process or a latent heat transfer process, thereby enabling the utilization of a high heat transfer performance so as to make the heat exchanger smaller.

The invention according to a further aspect is an air conditioning system wherein the desiccant has a wheel shape so that, by rotating the desiccant, it repeatedly shifts its position between the first zone and the second zone.

Accordingly, by shaping the desiccant as a wheel to enable it to rotate, process air dehumidifying by the desiccant and desiccant regeneration by the regeneration air, to which heat energy of the refrigerant is adequately transferred, can be performed continually.

BEST MODE FOR CARRYING OUT THE INVENTION

Figure 1A:
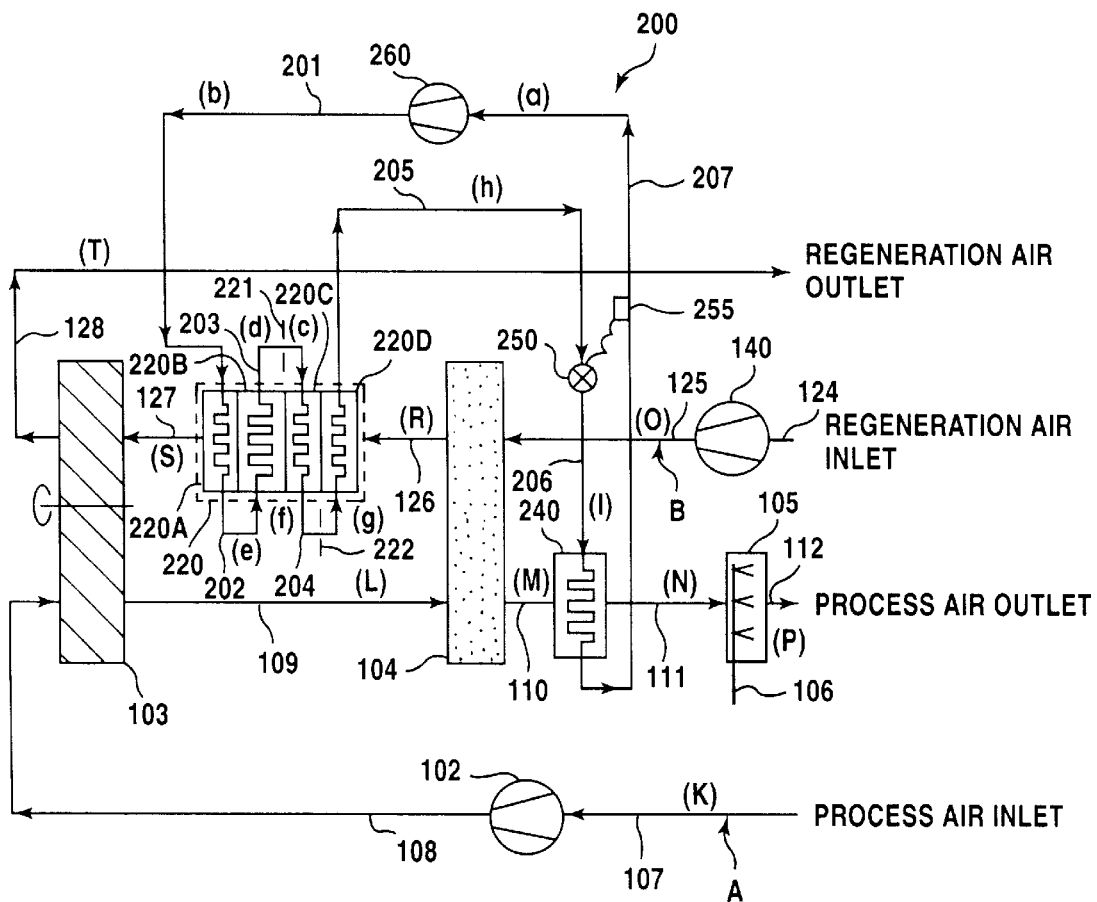
FIG. 1A is a diagram to explain the basic structure of a first embodiment of the air conditioning system of the present invention.
Figure 1B:
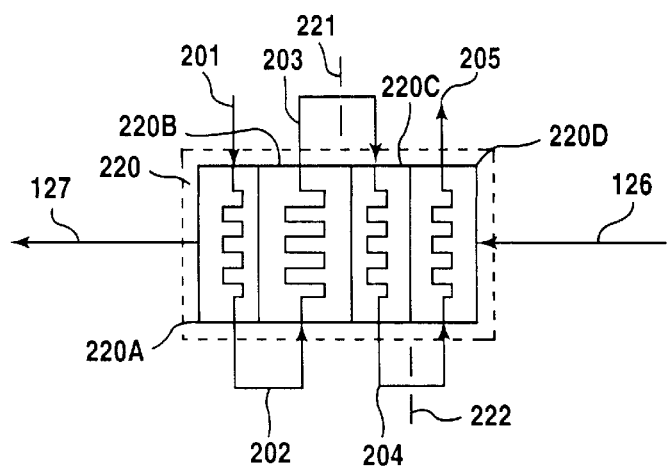
FIG. 1B is a diagram showing the high-temperature heat source heat exchanger of FIG. 1A in detail.

Preferred embodiments will be presented with reference to the drawings. FIG. 1A shows a diagram of the basic structure of a first embodiment of the air conditioning system of the present invention. A vapor compression type heat pump 200 comprises: a compressor 260; a low-temperature heat source heat exchanger (evaporator) 240; a high-temperature heat source heat exchanger (condenser) 220; and an expansion valve 250 so as to construct a vapor compression type refrigeration circuit. The high-temperature heat source heat exchanger (condenser) 220 is, as shown in FIG. 1B, divided into a plurality of sections 220D, 220C, 220B, 220A along the air flow direction, and air flows through those sections in an opposite order to the refrigerant, thereby to construct a heat exchanger assembly in which the refrigerant passage is formed as follows: the exit of the compressor 260 is connected to the first section 220A of the high-temperature heat source heat exchanger (condenser) 220 through a passage 201, the exit of the first section 220A of the high-temperature heat source heat exchanger (condenser) 220 is connected to the second section 220B of the high-temperature heat source heat exchanger (condenser) 220 through a passage 202, the exit of the second section 220B of the high-temperature heat source heat exchanger (condenser) 220 is connected to the third section 220C of the high-temperature heat source heat exchanger (condenser) 220 through a passage 203, and constriction device 221 such as an orifice, the exit of the third section 220C of the high-temperature heat source heat exchanger (condenser) 220 is connected to the fourth section 220D of the high-temperature heat source heat exchanger (condenser) 220 through a passage 204 and constriction device 222 such as an orifice, and the exit of the fourth section 220D of the high-temperature heat source heat exchanger (condenser) 220 is connected to an expansion valve 250 through a passage 205.

Figure 6:
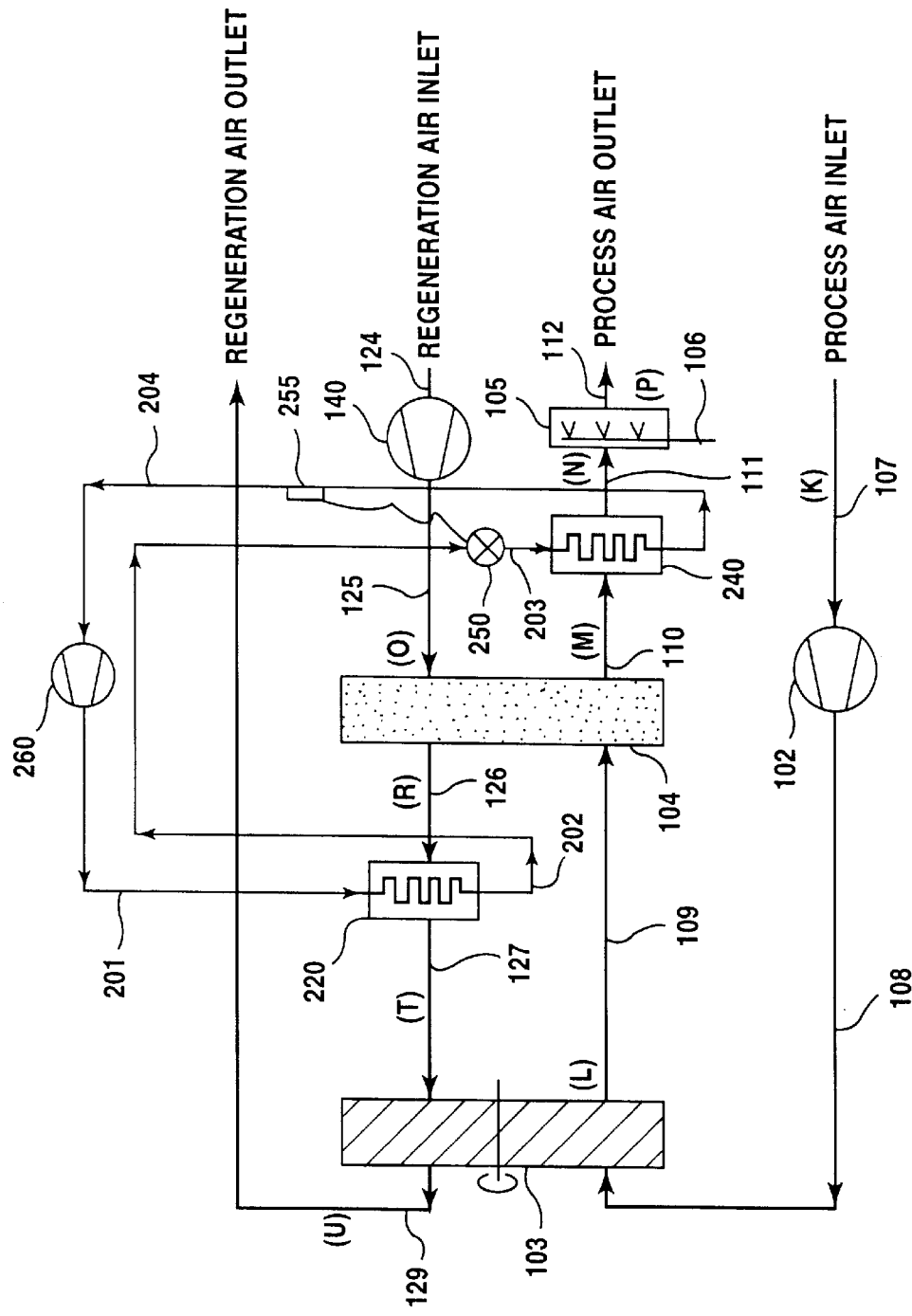
FIG. 6 is a diagram of another conventional desiccant-assisted air conditioning system.
Figure 7:
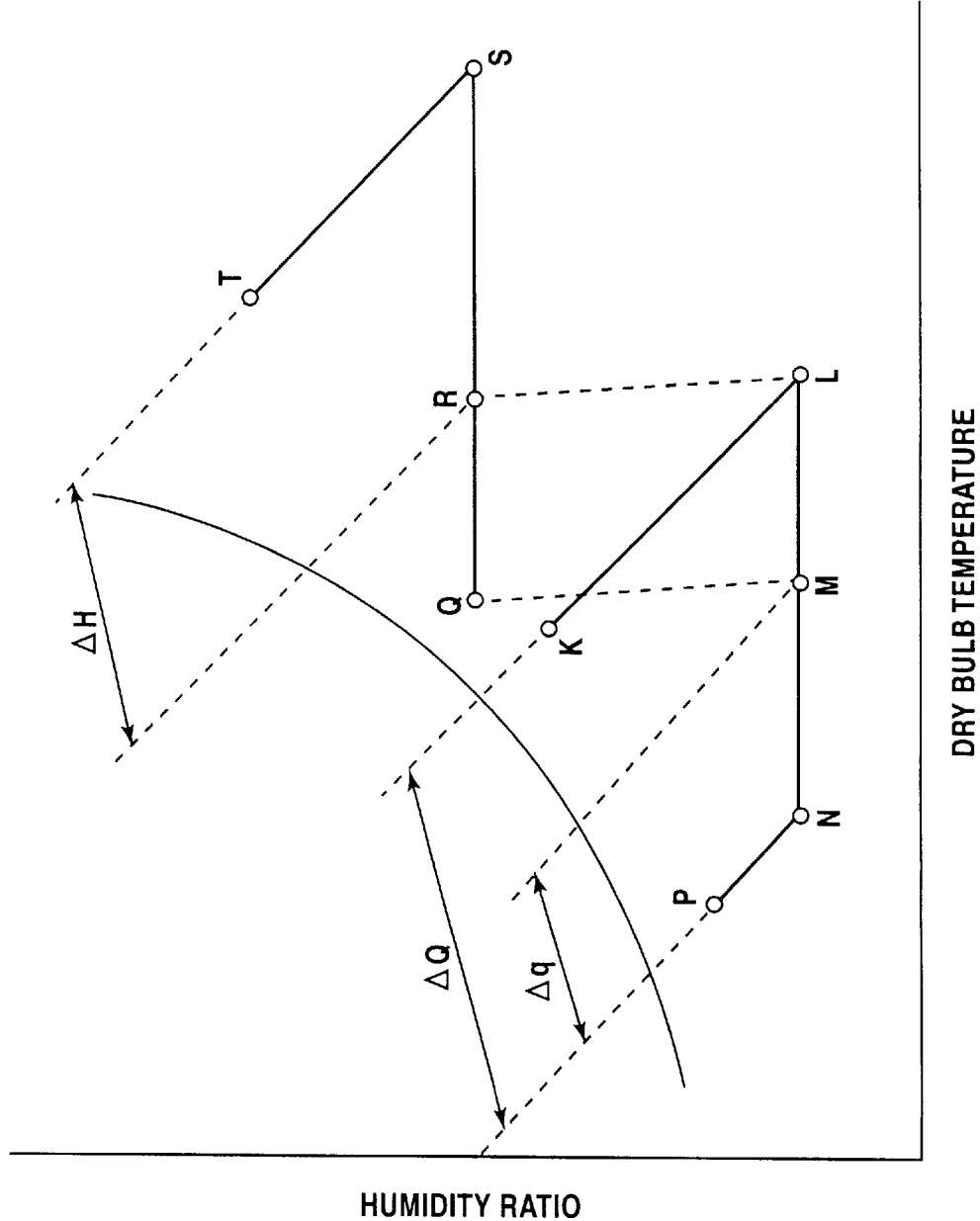
FIG. 7 is a psychrometric chart showing desiccant air conditioning process in the conventional system shown in FIG. 6.

Desiccant wheel 103 rotates at a given rotational speed while straddling both the process air passage A and the regeneration air passage B, as explained in FIG. 6. In the process air passage A, the inlet of the blower 102 for return air is connected to the conditioning space through a passage 107, and the outlet of the blower 102 is connected to the first zone that performs moisture adsorption in the desiccant wheel 103 through a passage 108, and the outlet of the desiccant wheel 103 for the process air is connected to a sensible heat exchanger 104 for heat exchange with regeneration air through a passage 109, and the outlet of the sensible heat exchanger 104 for the process air is connected to the low-temperature heat source heat exchanger (evaporator) 240 through a passage 110, and the outlet of the low-temperature heat source heat exchanger (evaporator) 240 for process air is connected to a humidifier 105 through a passage 111, and the outlet of the humidifier 105 is connected to an outlet for processed air or a room air supply opening through a passage 112. This sequence constitutes a process air circuit.

In the meantime, regeneration air passage B is connected to the inlet of the blower 140 for admitting outside air for use as regeneration air through a passage 124, and the outlet of the blower 140 is connected to the sensible heat exchanger 104 for exchanging heat with process air, and the outlet of the sensible heat exchanger 104 for regeneration air is connected to the high-temperature heat source heat exchanger (condenser) 220 through a passage 126, and inside the high-temperature heat source heat exchanger (condenser), regeneration air flows through the sections in the order of 220D, 220C, 220B, 220A, as described above, and the outlet of the high-temperature heat source heat exchanger (condenser) 220 for regeneration air is connected to the second zone of the desiccant wheel 103 for performing desiccant regeneration through a passage 127, and the outlet for the regeneration air in the second zone of the desiccant wheel 103 is connected to the ambient space through a passage 128. This sequence constitutes a circuit for admitting outside air and discharging spent air to outside. In the drawing, circled alphabet letters K–T refer to various states of air discussed in relation to FIG. 4.

A cyclic process in the vapor compression type refrigeration circuit of the desiccant-assisted air conditioning apparatus constructed as described above will be explained in the following. The refrigerant evaporates in the low-temperature heat source heat exchanger (evaporator) 240 by receiving latent heat of evaporation from the process air that has been dehumidified in the desiccant wheel 103. The evaporated refrigerant is drawn into the compressor 260 through a passage 207 to be compressed. The compressed refrigerant flows into the high-temperature heat source heat exchanger (condenser) 220 through the passage 201. Inside the high-temperature heat source heat exchanger (condenser) 220, refrigerant passes through the sections in the order of 220A, 220B, 220C, 220D, and exchanges heat in a counter-flow manner with regeneration air flowing through the sections in the order of 220D, 220C, 220B, 220A from the reverse direction, so that refrigerant temperature is raised in those sections progressively in the order of 220D, 220C, 220B, 220A affected by sensible heat changers of the air. Thus, refrigerant is subjected to the following processes: superheated vapor exiting the compressor exchanges heat with the regeneration air in section 220A, and saturated vapor exchanges heat with regeneration air to be condensed in the section 220B, and it undergoes self-evaporation after being reduced of its pressure and temperature by the constriction 221 when transiting from section 220B to 220C, and is re-condensed in the section 220C, and it again undergoes self-evaporation after being reduced of its pressure and temperature by the constriction 222 when transiting from section 220C to 220D, and is re-condensed in the section 220D. Refrigerant condensed in the section 220D of the high-temperature heat source heat exchanger (condenser) 220 reaches the expansion valve 250 through passage 205, expands and reduces pressure, and flows back to the low-temperature heat source heat exchanger (evaporator) 240.

Figure 2:
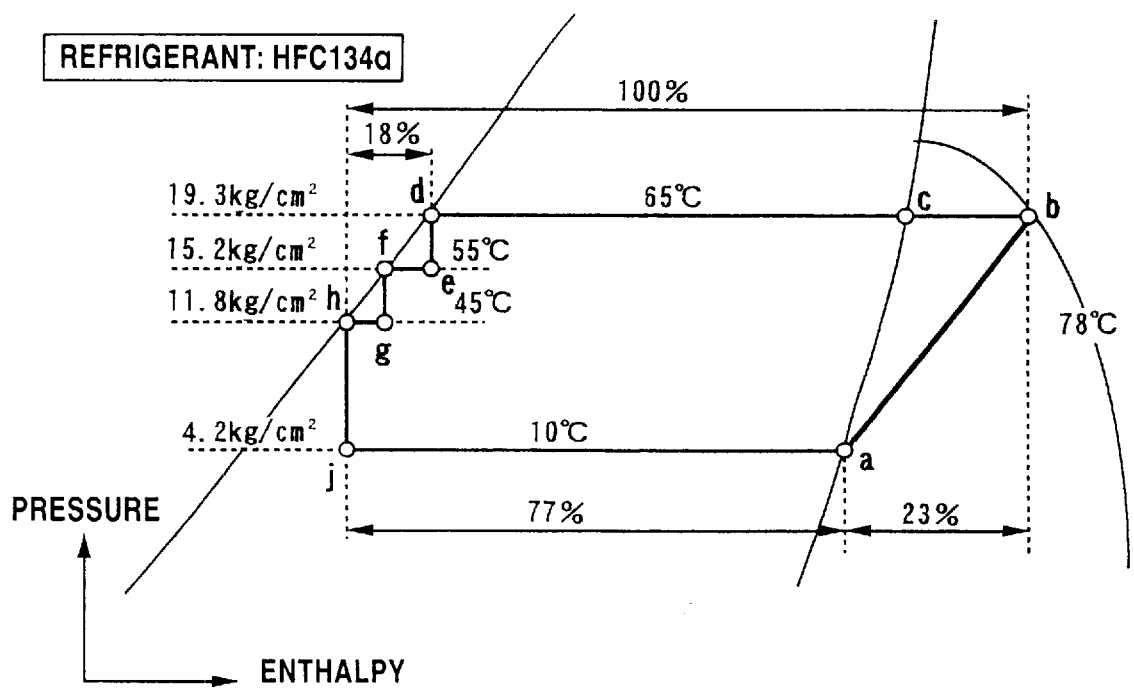
FIG. 2 is a Mollier diagram of the refrigerant process in the heat pump in the air conditioning system shown in FIG. 1.

The thermal process of the refrigerant will be explained with reference to the Mollier diagram shown in FIG. 2. The refrigerant evaporates (state a) in the low-temperature heat source heat exchanger (evaporator) 240 by receiving latent heat of evaporation from the process air that has been dehumidified in the desiccant wheel 103, and is drawn into the compressor 260 through a passage 207 to be compressed. The compressed refrigerant (state b) flows into the high-temperature heat source heat exchanger (condenser) 220. Inside the high-temperature heat source heat exchanger (condenser) 220, refrigerant exchanges heat in progressive steps in the temperature order from high temperature to low temperature according to the sensible heat change of the air. That is, inside the high-temperature heat source heat exchanger (condenser) 220, refrigerant first enters the section 220A to release sensible heat of superheated vapor to lower its temperature (state c), then enters the section 220B of the high-temperature heat source heat exchanger (condenser) 220 to release most of latent heat of condensation to regeneration air thereby to be condensed (state d). The saturated liquid of refrigerant exiting from section 220B of the high-temperature heat source heat exchanger (condenser) 220 undergoes self-evaporation by the constriction 221 to reduce pressure in isoenthalpic process to become wet vapor (state e), and is re-condensed (state f) in the section 220C of the high-temperature heat source heat exchanger (condenser) 220 by exchanging heat with relatively low temperature regeneration air in the vicinity of the inlet. Further, the saturated liquid of refrigerant exiting from section 220C of the high-temperature heat source heat exchanger (condenser) 220 again undergoes self-evaporation by the constriction 222 to reduce pressure in isoenthalpic process to become wet vapor (state g), and is re-condensed (state h) in the section 220D of the high-temperature heat source heat exchanger (condenser) 220 by exchanging heat with low temperature regeneration air in the closest area to the inlet. Refrigerant condensed in the section 220D of the high-temperature heat source heat exchanger (condenser) 220 reaches the expansion valve 250, expands and reduces pressure (state j), and flows back to the low-temperature heat source heat exchanger (evaporator) 240.

In this embodiment, the refrigerant is condensed at 55° C. in section 220C, and further condensed at 45° C. in section 220D, thus the refrigerant releases an enthalpy difference from superheated vapor of post-compression state b at 78° C. to saturated liquid in state h at 45° C. into regeneration air, and is also able to obtain an enthalpy difference from saturated liquid in state h at 45° C. to dry saturated vapor in state a at 10° C. in the evaporator 240. Accordingly, if the heat transfer to regeneration air makes 100%, power for the compressor corresponding 23% is necessary while 77% refrigeration effect is obtained. Also, heat transfer in sections 220C, 220D corresponds to 18% of the entire input heat amount.

Figure 3:
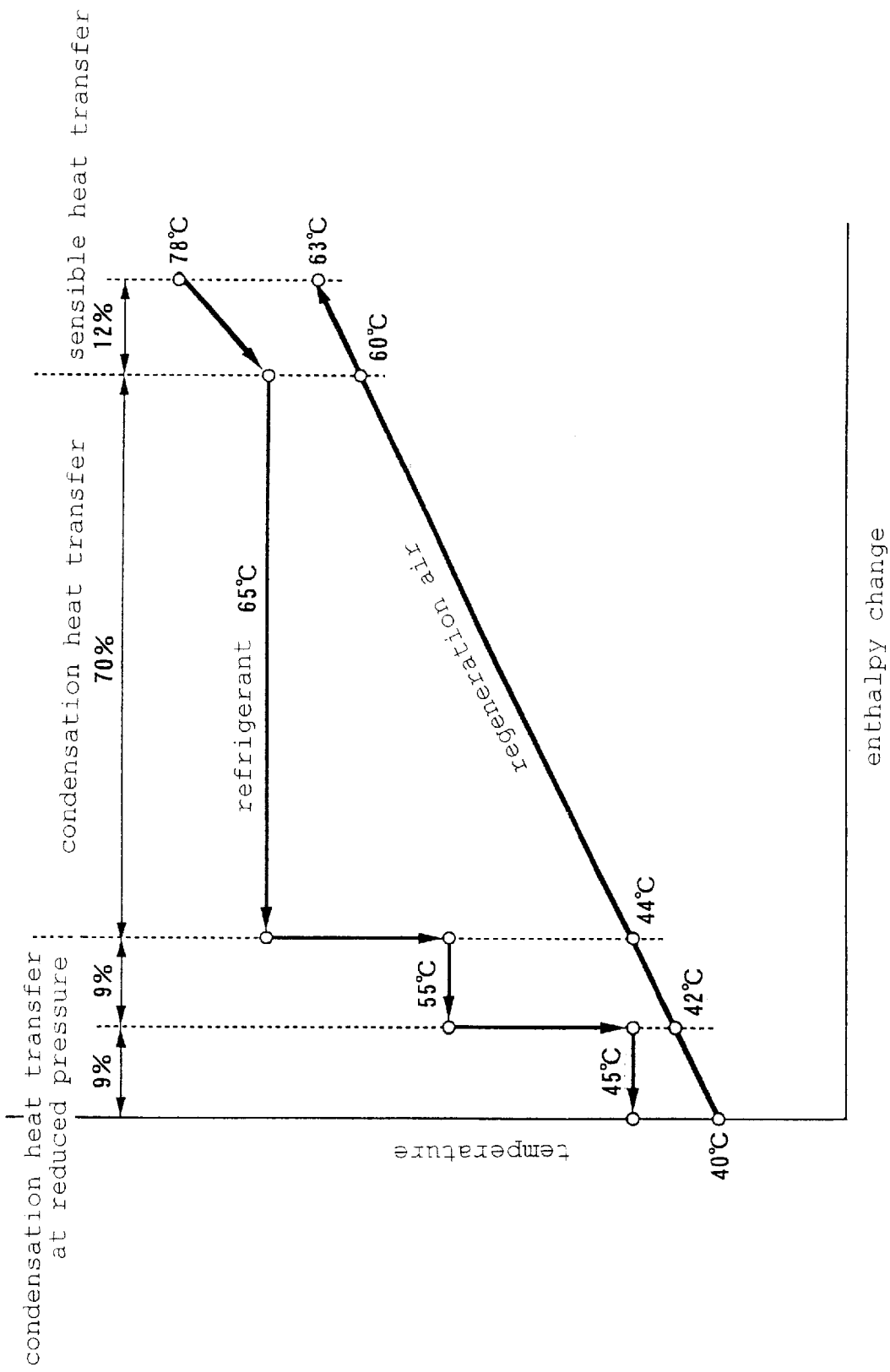
FIG. 3 is a graph showing a relation between enthalpy (heat content) change and temperature of the high pressure refrigerant in the heat pump acting as a heat source and regeneration air in the embodiment shown in FIG. 1.

FIG. 3 is a graph showing a relation between temperature and enthalpy (quantity of heat) changes in the high pressure refrigerant serving as heat source in the heat pump 200 and in the regeneration air at the high-temperature heat source heat exchanger (condenser) 220 for the embodiment described in FIG. 1. When the refrigerant in the heat pump 200 exchanges heat with regeneration air, the changes in the enthalpy of refrigerant and regeneration air are equal due to heat balance. Also, because air undergoes sensible heat transfer processes with almost constant specific heat, they are represented by continuous lines of certain gradients in the graph, and because the refrigerant undergoes latent heat change and sensible heat change, the portion during latent heat change shows a horizontal line.

In this embodiment, high-temperature heat source heat exchanger (condenser) 220 is, as shown in FIG. 1B, divided into a plurality of sections 220D, 220C, 220B, 220A along the air flow direction, and air flows those sections in an opposite order relative to the refrigerant, thereby to avoid the situation that refrigerant and air exchange heat in a state of disorderly temperature distribution, so that, as shown in FIG. 3, the refrigerant can constantly maintain a higher temperature than the regeneration air until it becomes saturated liquid of 45° C., so as to facilitate to transfer the heat retained in the refrigerant to the air. Also, heat transfer by the refrigerant in the sections 220C, 220D is conducted through condensation heat transfer process accompanied by phase changes, it can exhibit a high heat transfer coefficient thereby enabling to make the heat exchanger smaller. In this embodiment, condensation and evaporation of the refrigerant is repeated twice, but single process can also provide a similar effect though it may be less profitable, and repeating more than twice is also effective.

Figure 4:
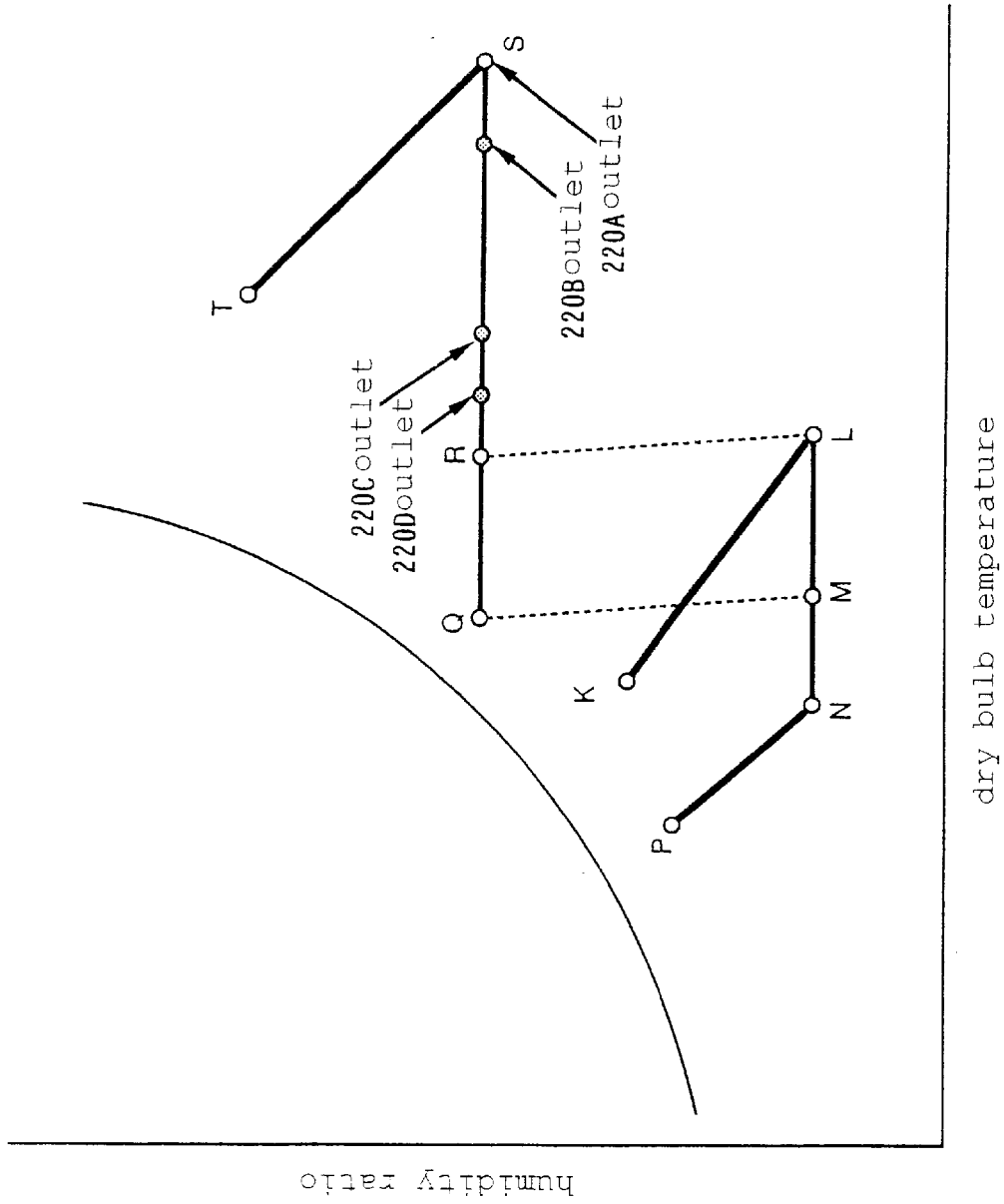
FIG. 4 is a psychrometric chart showing the operation of the desiccant-assisted air conditioning system shown in FIG. 1.
Figure 5:
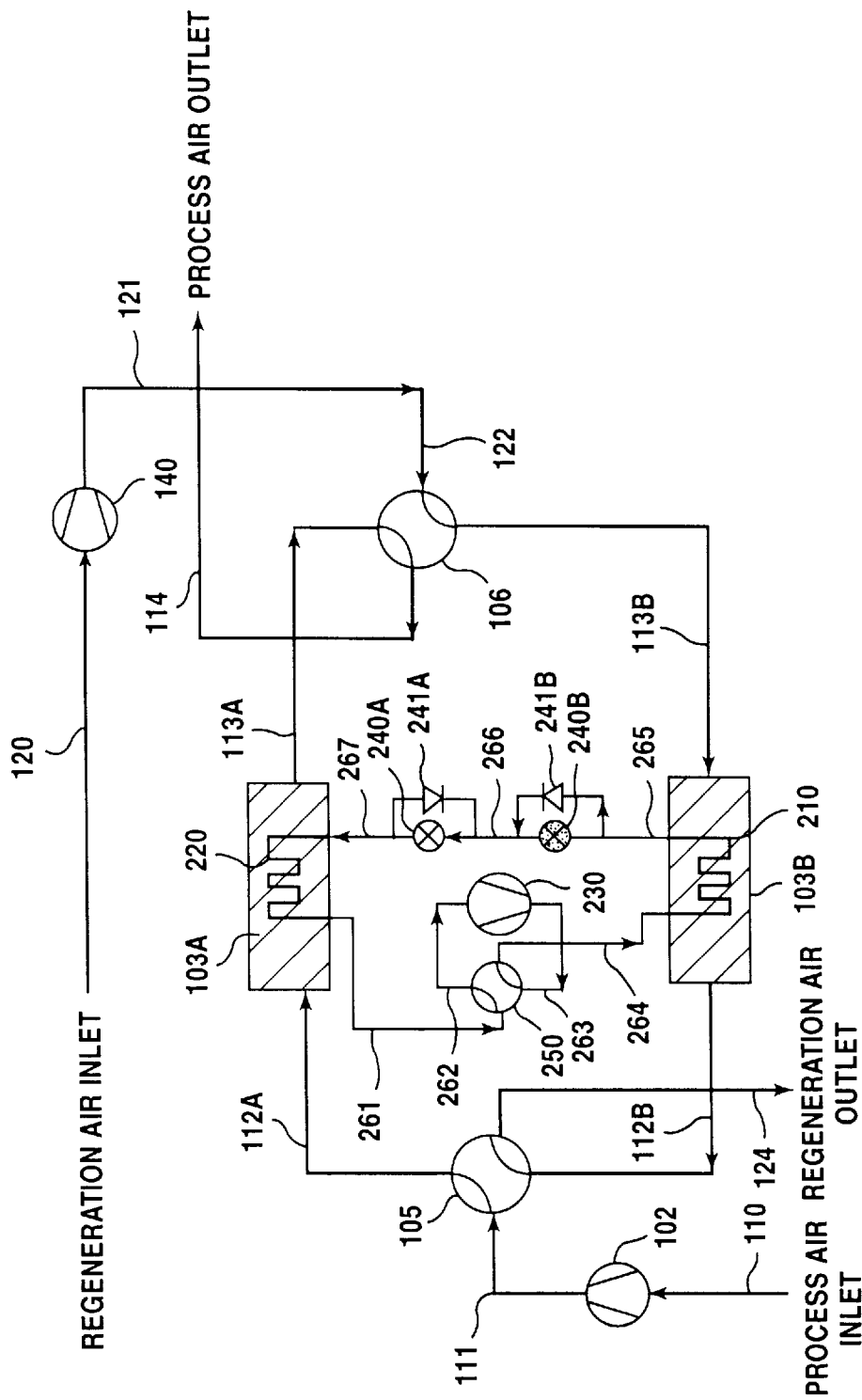
FIG. 5 is a diagram to explain the basic structure of the conventional desiccant-assisted air conditioning system.

Next, the operation of the system based on heat pump 200 as the heat source will be explained with reference to psychrometric charts shown in FIG. 4. Return air (process air: state K) admitted to the system passes through the passage 107 and is drawn into the blower 102, and is pressurized and sent to the first zone, through the passage 108, to perform moisture adsorption in the desiccant wheel 103, and moisture in the process air is adsorbed in the moisture adsorbent in the desiccant wheel 103, and the process air lowers its humidity ratio and raises its temperature due to transfer of heat of adsorption (state L). Process air that has been lowered in humidity and increased in temperature is sent to the sensible heat exchanger 104 through the passage 109, and exchanges heat with outside air (regeneration air) and is cooled (state M). Cooled process air passes through the passage 110 and is cooled while passing through the low-temperature heat source heat exchanger (evaporator) 240 (state N). Cooled process air is sent to the humidifier 105 and is cooled by water spraying or evaporative humidification in an isenthalpic process (state P), and is returned through the passage 112 as supply air to the conditioning space.

On the other hand, regeneration of the desiccant wheel 103 is carried out as follows. Outside air (state Q), used as regeneration air, passes through the passage 124, and is drawn into the blower 140, and is pressurized and sent to the sensible heat exchanger 104, where it cools the process air while raising its own temperature (state R), and reaches the high-temperature heat source heat exchanger (condenser) 220 through the passage 126. In the high-temperature heat source heat exchanger (condenser) 220, regeneration air flows through the sections in the order of 220D, 220C, 220B, 220A, as described above, in a reverse direction to the refrigerant, where it is heated by the latent heat of condensation of the refrigerant shifting from state g to state h in FIG. 2 in the section 220D, and it is heated by the latent heat of condensation of the refrigerant shifting from state e to state f in FIG. 2 in the section 220C, and it is heated by the latent heat of condensation of the refrigerant shifting from state c to state d in FIG. 2 in the section 220B, and it is heated by the sensible heat of the superheated vapor shifting from state b to state c in FIG. 2 in the section 220A, and finally reaches the state S to be increased in temperature. Regeneration air exiting from the high-temperature heat source heat exchanger (condenser) 220 passes through the zone of desiccant wheel 103 for performing regeneration, and desorbs moisture from the desiccant wheel 103 (state T), and is discarded outside as spent air through the passage 128.

Figure 8:
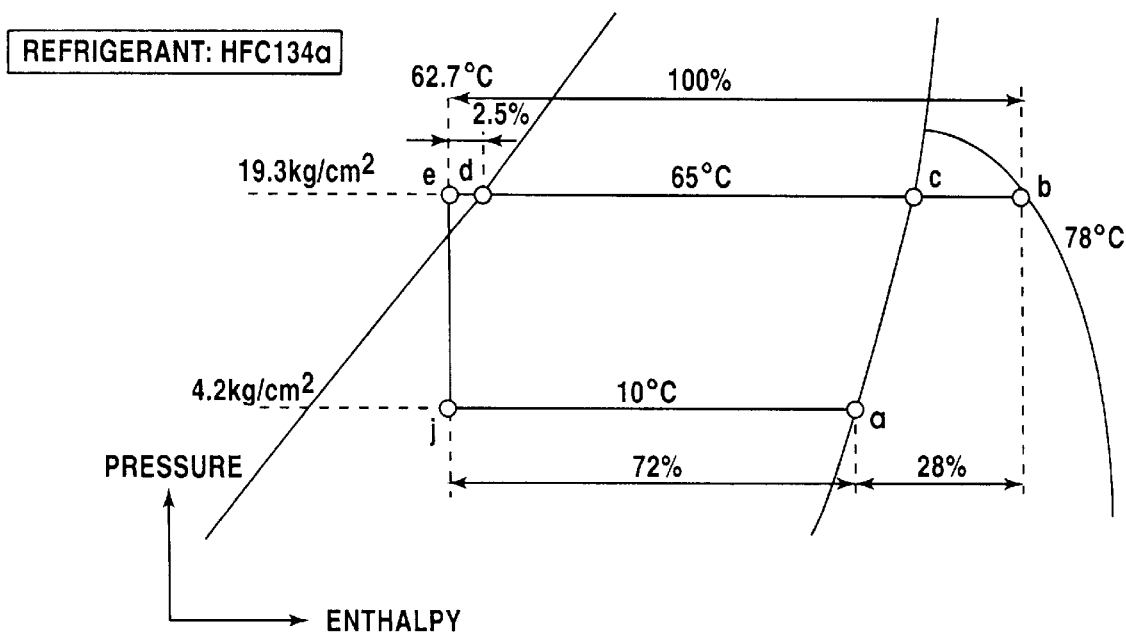
FIG. 8 is a Mollier diagram of a vapor compression type refrigeration process in the conventional desiccant-assisted air conditioning system shown in FIG. 6.
Figure 9:
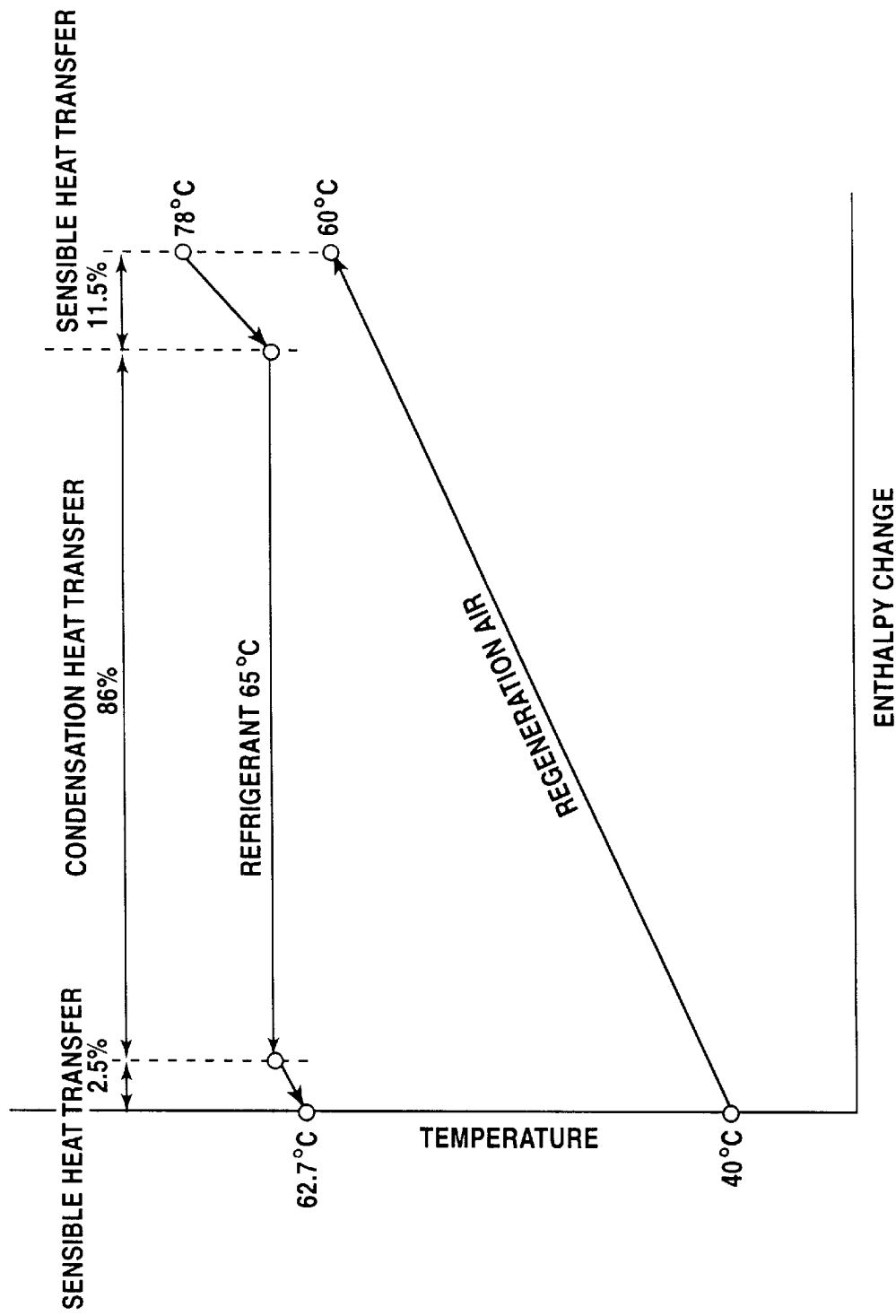
FIG. 9 is a graph showing a relation between temperature and enthalpy change (heat content) of the high pressure refrigerant in the heat pump acting as a heat source and regeneration air in the conventional system shown in FIG. 6.

Accordingly, the system operates conditioning by repeating the processes of desiccant regeneration and dehumidifying and cooling of the process air. In this embodiment, as described above, assuming that the heat transfer to regeneration air is 100%, power for the compressor corresponding to 23% is necessary while 77% refrigeration effect is obtained. Thus, compared to the conventional system shown in FIG. 8, power for the compressor necessary for releasing the same amount of heat to regeneration air is saved by:

$$(1-23/28) \times 100 = 18\%,$$

and because of the increase of refrigeration effect, the processing ability for latent heat of the process air is increased by:

$$(77/72-1) \times 100 = 7\%.$$

Accordingly, by dividing the high-temperature heat source heat exchanger into a plurality of sections along the air flow direction, the regeneration air passes the sections in an opposite order to that of the refrigerant so that the refrigerant condensed in the heat pump 200 is further cooled by exchanging heat with the regeneration air, flowing in the vicinity of the inlet of the high-temperature heat source heat exchanger and being at its lowest temperature, thereby transferring the heat energy retained in the refrigerant adequately to the regeneration air, so that it enables to enhance regeneration air heating ability, save the compressor input power, increase cooling ability (sensible heat processing ability) for process air, so as to provide an energy saving air conditioning system having a high dehumidification and sensible heat processing ability.

In this embodiment, an example where condensed refrigerant is self-evaporated and is re-condensed, but it can be used without self-evaporation, so that saturated liquid is led to supercooled liquid to provide similar effects of saving input power and increasing latent heat processing ability. However, in this case, heat transfer is performed through a sensible heat change of the refrigerant without phase change, heat transfer efficiency is low so that a larger heat transfer is necessary.

As described above, by the present invention, in an air conditioning system that can operate continually an air dehumidifying process by a desiccant and regeneration of the desiccant by heat pump, refrigerant condensed in the heat pump is further cooled by exchanging heat with the regeneration air, flowing in the vicinity of the inlet of the high-temperature heat source heat exchanger and, being at its lowest temperature, thereby transferring the heat energy retained in the refrigerant adequately to the regeneration air, so that it enables to enhance regeneration air heating ability, save the compressor input power, increase cooling ability (sensible heat processing ability) for process air, so as to provide an energy saving air conditioning system having a high dehumidification and sensible heat processing ability.

INDUSTRIAL APPLICABILITY

This invention can be used as an air conditioning system for use in normal dwellings or in large buildings, such as supermarkets and offices, for example.

What is claimed is:

1. An air conditioning system comprising: a desiccant for adsorbing moisture from process air, and a heat pump, including a compressor, that operates by using process air as a low-temperature heat source and regeneration air as a high-temperature heat source so as to supply heat to regeneration air for regenerating said desiccant;

wherein a high-temperature heat source heat exchanger, for exchanging heat with pre-desiccant regeneration air and refrigerant, comprises a plurality of sections divided along an air flow direction, and regeneration air passes said sections in an opposite order to that of refrigerant, and wherein, in said high-temperature heat source heat exchanger said sections include, in series, a refrigerant sensible heat transfer section, a refrigerant condensation heat transfer section, a refrigerant constriction device, and a reduced-pressure refrigerant condensation heat transfer section for counter-flow transfer of heat between said refrigerant and said pre-desiccant regeneration air.

2. An air conditioning system according to claim 1, wherein paths of process air and regeneration air that pass through said desiccant are divided into a first zone for performing dehumidifying of process air and a second zone for performing regeneration of said desiccant using regeneration air, and wherein said desiccant repeatedly shifts its position between said first zone and said second zone.

3. An air conditioning system according to claim 2, wherein said desiccant is rotatable and, by rotating said desiccant, it repeatedly shifts its position between said first zone and said second zone.

4. An air conditioning system according to claim 1, wherein said desiccant is rotatable and, by rotating said desiccant, it repeatedly shifts its position between said first zone and said second zone.

5. An air conditioning system comprising: a desiccant for adsorbing moisture from process air, and a heat pump, including a compressor, that operates by using process air as a low-temperature heat source and regeneration air as a high-temperature heat source so as to supply heat to regeneration air for regenerating said desiccant;

wherein a high-temperature heat source heat exchanger, for exchanging heat with pre-desiccant regeneration air and refrigerant, comprises a plurality of sections divided along an air flow direction, and regeneration air passes said sections in an opposite order to that of refrigerant; and wherein, in said high-temperature heat source heat exchanger, a flow constriction device is arranged in a refrigerant path connecting at least two of said sections, so that a refrigerant pressure in a first section most adjacent to an inlet for regeneration air is maintained lower than that in a second section adjacent to said inlet for regeneration air for condensing refrigerant at different pressures in said sections.

* * * * *